3,168,582
BUTADIENYLMAGNESIUM CHLORIDE

Carl Albert Aufdermarsh, Wilmington, Del., assignor to E. I. du Pont de Nemours and Company, Wilmington, Del., a corporation of Delaware
No Drawing. Filed Apr. 4, 1962, Ser. No. 184,949
3 Claims. (Cl. 260—665)

This invention is related to a new organo-magnesium halide which is useful as an intermediate for the preparation of unsaturated organic compounds. More specifically, this invention relates to the new compound, butadienylmagnesium chloride, and to a process for its preparation.

Butadiene, isoprene, and the like which contain conjugated carbon-to-carbon double bonds are of great importance as starting monomers for useful polymeric materials. While a variety of compounds have been used for the preparation of such starting monomers, additional compounds are desired.

It is an object of this invention to provide a new chemical compound which is useful as an intermediate for the preparation of compounds containing conjugated carbon-to-carbon double bonds. It is also an object of this invention to provide a process for the preparation of the new compound. Other objects will appear hereinafter.

These and other objects are accomplished by butadienylmagnesium chloride of the formula

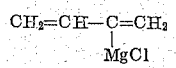

The new compound, more particularly 1,3-butadien-2-yl-magnesium chloride, is made by reacting 4-chloro-1,2-butadiene of the formula

with magnesium in the presence of an ether solvent.

To prepare the new compound 1,3-butadien-2-yl-magnesium chloride, a solution containing 10 to 50 percent by weight of chlorobutadiene, more particularly 4-chloro-1,2-butadiene, in ether solvent is added dropwise to a vigorously agitated mixture of finely divided magnesium metal (coarse powder, turnings, etc.) and 10 to 20 times its weight of the solvent. Ethyl ether is the preferred solvent. The amount of solvent used is not critical, but use of a dilute solution minimizes the occurrence of undesired side reactions by preventing, in combination with vigorous stirring, the formation of local high concentrations of starting material and product. In order to promote complete reaction of the organic compound, excess magnesium is preferred. A ten mole percent excess of magnesium should be sufficient although more or less may be used.

The reaction can be carried out between 10° C. and 100° C. Below 10° C. the reaction proceeds too slowly to be practical and above 100° C. the product yield and quality are adversely affected. The preferred temperature range is between 20° C. and 70° C. While it is not essential, it is convenient to carry out the reaction under reflux conditions for the solvent employed, in which case the solution of chlorobutadiene can be added at such a rate that the heat generated by the exothermic reaction maintains the solvent at gentle reflux. If the reflux temperature of the ether solvent being used is higher than the desired reaction temperature, the temperature of the reaction mixture can be controlled by conventional cooling techniques, as required.

After all of the chlorobutadiene has been added, the reaction is completed by maintaining the mixture at the desired reaction temperature for a short time. Usually about thirty minutes is sufficient, although the time will vary with the temperature and other operating factors. It is preferred to carry out the reaction in an inert atmosphere, such as in an atmosphere of nitrogen. If necessary, the reaction can be initiated by addition of materials such as methyl iodide, mercuric chloride, iodine and preformed organomagnesium compounds, such as ethylmagnesium bromide, which are known initiators for the preparation of organomagnesium halides.

The solvent solution of the butadienylmagnesium chloride may be used directly for the preparation of other compounds, such as isoprene or butadiene. If desired, it may be filtered in the absence of air and moisture to remove magnesium particles.

The ether solvents that may be used in preparing the new compound of this invention are dialkyl ethers which are liquids at normal atmospheric pressure at the temperature of the reaction, that is, in the range 10° to 100° C. If reflux conditions are to be used, the ether solvent should have a boiling point within this temperature range. This, however, is not essential. In general, the suitable solvents are dialkyl ethers containing a total of at least four carbon atoms and no more than eight carbon atoms in the molecule. While higher-boiling ethers may be used, if desired, there is usually no advantage to be gained.

Examples of suitable ethers include symmetrical dialkyl ethers, such as ethyl ether, n-propyl ether, isopropyl ether, n-butyl ether, isobutyl ether, and sec-butyl ether, and unsymmetrical dialkyl ethers such as methyl isopropyl ether, ethyl n-propyl ether, ethyl isoamyl ether, and methyl n-heptyl ether. Because of its ready availability, ethyl ether is the preferred solvent. It is essential that the solvent be anhydrous.

The starting material used in preparing the compound of this invention is of the formula

The starting material is described in U.S. Patent Nos. 1,950,431 and 2,104,789 and J. Am. Chem. Soc., 55, 2807–13 (1933).

The compound of this invention is a useful starting material for the preparation of unsaturated compounds such as butadiene and isoprene, the latter being illustrated in Example 2.

Representative examples illustrating the present invention are as follows:

EXAMPLE 1

*Preparation of 1,3-butadien-2-ylmagnesium chloride*

A 100-ml. round-bottom flask equipped with mechanical agitator, reflux condenser, and dropping funnel is swept with nitrogen. The flask is charged with 1.2 grams of magnesium turnings and about 14.3 grams (20 ml.) of anhydrous ethyl ether. To the dropping funnel is charged 4.0 grams of 4-chloro-1,2-butadiene in 14.3 grams (20 ml.) of anhydrous ethyl ether. Two ml. of the 4-chloro-1,2-butadiene is added to the flask through the dropping funnel and the flask is heated to reflux. There is now added to the flask a mixture prepared as follows:

In a small test tube is placed 0.04 gram of magnesium turnings, 0.025 gram of mercuric chloride, 0.7 gram of ethyl ether, 0.02 gram of 4-chloro-1,2-butadiene and 0.03 gram of methyl iodide. Brief warming and crushing of the magnesium with a stirring rod initiates an exothermic reaction. The mixture so obtained is added to the refluxing mixture in the round-bottom flask.

Dropwise addition of the 4-chloro-1,2-butadiene from the dropping funnel is now continued with mild agitation until the reaction becomes self-sustaining. External heating is discontinued and the remainder of the 4-chloro-1,2- butadiene is added dropwise with agitation over a period of 30 minutes. After an additional 15 minutes the reaction mixture stops refluxing. External heat is applied and refluxing is continued for 30 minutes. A Gilman test No. I of the solution is positive [re: Gilman et al., J. Am. Chem. Soc., 47, 2002–5 (1925)]. An titration by the Gilman method [re: Gilman et al., J. Am. Chem. Soc., 51, 1576 (1929)] indicates that the yield of the magnesium chloride compound is 95%. The infrared spectrum of the ether solution shows strong absorption bands typical of the vinyl group (10.0μ), the methylene group (11.2μ) and the conjugated double bond (6.25μ). The absence of an absorption band in the region of 5.1μ indicates the allenic double bond is absent and confirms the rearranged structure of the product as being

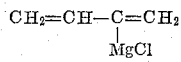

The structure is further confirmed by converting the compound to butadiene by reaction with ethanol.

Approximately half of the solution prepared above is added dropwise to 2 grams of 95% ethanol in 20 ml. of ethyl ether. Off-gases are carried by a stream of nitrogen into a polymer tube containing 3.0 grams of maleic anhydride dissolved in 10 ml. of acetone and cooled in a Dry Ice-acetone bath (about −78° C.). A heavy slurry which forms is broken up by the addition of 10 ml. of ethanol. The system is swept with nitrogen for one hour.

The polymer tube is sealed and allowed to stand at room temperature for three days. The contents are removed and volatile material is driven off with a nitrogen stream, leaving a partially crystalline mass which is refluxed for two hours with 25 ml. of water. On cooling in an ice bath, a white solid separates. After drying in a vacuum dessicator the product has the proper analysis for 4-cyclohexene-1,2-dicarboxylic acid and melts at 164–166° C. A mixed melting point with an authentic sample of the acid melts at 165–166° C. The infrared spectra of the product and of the authentic acid are identical.

EXAMPLE 2

*Preparation of isoprene*

1,3-butadien-2-ylmagnesium chloride is prepared as described in the preceding example using 20 grams of 4-chloro-1,2-butadiene and 5.6 grams of magnesium turnings. The ether solution is decanted from excess unreacted magnesium and heated to reflux under nitrogen. 52 grams of methyl iodide is added and the mixture is refluxed for about 2 hours. There is no apparent reaction. 0.1 gram of cuprous chloride is then added, whereupon a vigorous exothermic reacton ensues and a white solid separates. After the reaction abates, an additional 0.05 gram of cuprous chloride is added. The resulting exothermic reaction subsides within a few minutes. After 10 minutes the Gilman Test No. I is negative. To the reaction mixture is added 100 ml. of ice and water. The precipitated inorganic salts are redissolved by adding 10 ml. of concentrated hydrochloric acid. The ether layer formed by the water addition is separated, washed successively with water and a 5 percent aqueous solution of sodium bicarbonate, and dessicated over magnesium sulfate to give 102 grams of ether solution. Gas phase chromatography shows that the solution contains 7 grams (45 percent yield) of isoprene.

As many apparently widely different embodiments of this invention may be made without departing from the spirit and scope thereof, it is to be understood that this invention is not limited to the specific embodiments thereof except as defined in the appended claims.

What is claimed is:

1. The compound 1,3-butadien-2-ylmagnesium chloride.
2. A process which comprises contacting and reacting in the presence of a dialkyl ether solvent, 4-chloro-1,2-butadiene and magnesium and obtaining as a result thereof the compound of claim 1.
3. A process which comprises contacting and reacting in the presence of ethyl ether, 4-chloro-1,2-butadiene and magnesium and obtaining as a result thereof the compound of claim 1.

References Cited in the file of this patent

UNITED STATES PATENTS

| | | |
|---|---|---|
| 2,072,867 | Carothers | Mar. 9, 1937 |
| 3,083,242 | Ramsden | Mar. 26, 1963 |